United States Patent [19]

Spielau et al.

[11] 3,850,725

[45] Nov. 26, 1974

[54] ADHESION OF MATERIALS COATED WITH ACTIVATABLE FUSIBLE ADHESIVE

[75] Inventors: Paul Spielau; Erich Betke, both of Troisdorf-Spich; Manfred Simon, Niederkassel, all of Germany

[73] Assignee: Dynamit Nobel AG, Troisdorf, Postfach, Germany

[22] Filed: Oct. 21, 1971

[21] Appl. No.: 191,561

[30] Foreign Application Priority Data

Oct. 31, 1970   Germany............................ 2053587
Oct. 21, 1970   Germany............................ 7038817

[52] U.S. Cl................. 156/291, 156/306, 156/322, 156/332, 161/148, 161/231
[51] Int. Cl............................................. B32b 7/14
[58] Field of Search...... 12/142, 145; 156/290, 291, 156/306, 322, 332, 334, 295; 161/146, 148, 231

[56] References Cited
UNITED STATES PATENTS

| | | | |
|---|---|---|---|
| 3,047,444 | 7/1962 | Harwood | 156/291 X |
| 3,136,677 | 6/1964 | Woker | 156/332 X |
| 3,212,115 | 10/1965 | Crowell | 156/332 X |
| 3,235,520 | 2/1966 | Crowell | 156/332 X |
| 3,436,301 | 4/1969 | McHale | 156/332 X |
| 3,522,343 | 7/1970 | Chandler et al. | 156/295 X |

*Primary Examiner*—William A. Powell
*Attorney, Agent, or Firm*—Burgess, Dinklage & Sprung

[57] ABSTRACT

In the adhesion of a first material coated with an activatable fusible adhesive to a second identical or different material to form a multiple-layer structure, the improvement which comprises using a fusible adhesive whose open time is between about 10 and 60 seconds, subjecting the adhesive-coated first material to pressure-free activation by infrared radiation at an activation time of about 0.5 to 10 seconds, and then pressing the first and second materials together without additional heat input. The fusible adhesive is preferably a copolyester or copolyester mixture and is activated by directing the infrared radiation at that face of the coated first material which carries the adhesive. Preferably, the adhesive is applied to the first material in a cross-lattice pattern, the quantity amounting to about 30 to 120 g/m$^2$ and the open area amounting to about 50 to 70% of the total area.

6 Claims, No Drawings

ADHESION OF MATERIALS COATED WITH ACTIVATABLE FUSIBLE ADHESIVE

It is known to apply thermoplastic adhesives, such as polyesters, polyamides and ethylene-vinyl acetate copolymers as a continuous coating in a grid pattern to plastic sheet materials, leather, synthetic leather, papers, cardboards, vulcanized fiber, non-woven mats, woven fabrics, or the like. These fusible adhesives can be fused by heating in a press, upon cooling producing a bond between the materials being cemented together. This type of cementing eliminates the difficult and sometimes noxious use of adhesives containing solvents or of malodorous dispersion adhesives. The above-mentioned fusible adhesives, however, have the disadvantage of a short open time, i.e., when they have been thermally activated there is not enough time for corrections, since they set within a few seconds.

The commonly used "iron-on" fusible adhesives which are used for these purposes, such as ethylene-vinyl acetate copolymers for example, have an open time ranging between 3 and 7 seconds. This time, however, is too short for many procedures. A long open time is needed in shoe manufacturing, for example, for high heel shoes, when the shoe lining is to be joined to the leather upper.

It is accordingly an object of the present invention to provide a process for adhering materials using fusible adhesives, which process is performed simply, without loss of porosity and with sufficient opportunity for correction, if need be.

These and other objects and advantages are realized in accordance with the present invention wherein the cementing of materials coated with activatable fusible adhesives to identical or different materials to form laminated products is effected by using a fusible adhesive whose open time is between about 10 and 60 seconds, preferably about 20 to 60 seconds. This adhesive is subjected to a pressure-free activation by infrared radiators at activation times of about 0.5 to 10 seconds, preferably about 1 to 5 seconds, and then the materials are pressed without further heat input. The infrared radiators have a temperature, for example, of about 600° to 900°C and are mounted at a distance, for example, of about 5 to 20 cm from the surface.

the fusible adhesives used are, for example, copolyesters or copolyester mixtures which are composed of radicals of terephthalic acid, and in some cases isophthalic acid, and radicals of glycols or glycol mixtures, extended in some cases by from about 5 to 75 wt % of a copolymer of ethylene and vinyl acetate.

For example, a fusible adhesive is used which is prepared from the terephthalic acid and adipic acid components in a molar ratio of about 0.6 : 0.4 to 0.7 : 0.3, preferably in a molar ratio of about 0.67 : 0.33, and ethylene glycol and 1,6-hexanediol in a molar ratio of about 0.6 : 0.4 to 0.7 : 0.3, preferably in the ratio of about 0.63 : 0.37, in a manner well known in the art. The specific characteristics are a block point that is not too low (the adhesion point on the heating bench amounts to about 70°C) and a relatively low working temperature ranging between 120 and 195°C depending on the purpose for which it is used, and a viscosity in the molten state of 700 to 900 poises at 140°C.

Other examples of suitable adhesives are the following:

A copolyester mixture comprising about 70 to 95 wt % of a polyester based on terephthalic, isophthalic and sebacic acids in a mole ratio of about 1 : 1 : 1 and butanediol, and about 30 to 5 wt % of a polyester based on terephthalic, isophthalic and sebacic acids in a mole ratio of about 7 : 1:2 and butanediol;

A copolymer mixture comprising about 70 to 95 wt % of a polyester based on terephthalic, isophthlic and sebacic acids in a mole ratio of about 1 : 1 : 1 and butanediol and of about 30 to 5 wt % of a polyester based on terephthalic acid and a dimerized, unsaturated fatty acid such as linoleic or linolenic acid, in a mole ratio of about 8 : 2 and ethylene glycol and diethylene glycol in a mole ratio of from about 9 : 1 to 7 : 3; and A copolymer mixture comprising about 88 to 92 wt % of a polyester based on terephthalic and adipic acids in a mole ratio of about 0.67 : 0.33 and ethylene glycol and 1,6-hexanediol in a mole ratio of about 0.63 : 0.37, and about 12 to 8 wt % of a polyester based on on terphthalic acid and a dimerized, unsaturated fatty acid such as linoleic or linolenic acid, in a mole ratio of about 8 : 2, and ethylene glycol and diethylene glycol in a mole ratio of about 9: 1 to 7 : 3.

Copolymers based on ethylene and vinyl acetate can be added to these adhesives in quantities of about 0 to 75 wt %, preferably about 5 to 75%.

The application of the fusible adhesive to the material to be coated is performed by the hot melt process. The fussible adhesive is continuously melted, for example at about 185° to 195°C, in pots equipped with stirrers and is applied by means of a grid roll in a lattice pattern at 190°C at a linear speed of about 10 to 12 m/minute.

The quantity applied amounts to about 30 to 120 $g/m^2$, preferably about 50 to 70 $g/m^2$, and the uncovered surface area amounts to from about 50 to 70%, preferably about 60 to 70%, of the total area. The pattern used by way of example was a cross-lattice pattern with an engraving depth of 0.32 mm and a line width of 0.65 mm.

Continuous sheet materials intended for shoe linings, for example, can be coated continuously by this process in such a manner that, after the thermal activation of the fusible adhesive followed by pressing, the permeability of the shoe lining is assured.

The processes commonly used hitherto operate by the simultaneous action of heat and pressure, i.e., a material coated with fusible adhesive is laminated in a press with a platen heated to a certain temperature to another material, e.g., a shoe lining material coated with fusible adhesive is laminated to shoe upper material. These processes, however, are problematical when, as is the case with many products, the deformation temperature of the surface is close to the fusible adhesive activating temperature, thus creating the danger of adhesion to the press platen. This is often the case with thermoplastic materials. It is no solution to the problem to select a fusible adhesive having a lower activation temperature because a limit is reached due to blocking of the fusible adhesive.

The process of the invention makes it possible to overcome the previous working disadvantages and thus to create a greater number of practical applications. All of the difficulties have been eliminated by the process of shock activation of the fusible adhesive which is the subject of the invention. The principle is based on exposing the fusible adhesive directly to infrared radiation, melting it over a very brief period of time, e.g., about 1 to 2 seconds. The advantage of this procedure resides in the fact that the heat acts only on the adhesive side, while the coated material is not subjected to any direct, prolonged heating action. Furthermore, it is even possible, especially in the case of artificial leather, paper or other products, to achieve a shock activation of the above-mentioned fusible adhesives by letting the infrared radiation pass through these materials for a brief period of time, in the absence of pressure. Pressure-free thermal activation is one of the special features of the process of the invention. The products activated by the process can then be pressed cold in an appreciably extended period of time. This makes it possible to handle the materials gently; the long open time provides the possibility of making any necessary corrections, and the sticking of thermoplastic materials to hot parts of the pressing mold is prevented.

The process of the invention is of especial importance in the working of artificial leather that is permeable to air and water vapor, when the fusible adhesive has been applied, for example, in a cross-lattice pattern, because it does not interfere with the "breathing" qualities of the material.

The processes described with reference to artificial leather are, of course, applicable to all products which are to be bonded together with fusible adhesives, especially those in which gentle treatment is important.

The invention is further described in the following illustrative example.

EXAMPLE

Vinyl synthetic shoe upper fabric is printed in a cross-lattice pattern with molten adhesive at 190°C at a linear speed of 10 m/minute using an embossed print roll wherein the grooves are 0.65 mm wide and 0.37 mm deep. The adhesive is a copolyester comprising terephthalic acid, adipic acid, ethylene glycol and 1,6-hexanediol in the molar ratio of 0.67 : 0.33 : 0.63 : 0.37, the copolyester having an adhesion point of 70°C, a working temperature below 195°C and a viscosity in the molten state of 800 poises at 140°C. The adhesive is applied to the extent of 75 g/m$^2$, leaving an open area of 60%. The adhesive is allowed to cool and the fabric rolled up. When it is desired to laminate the fabric it is unrolled and passed, with the adhesive-coated side uppermost, under an infrared heater at a temperature of 750°C and positioned 20 cm above the fabric. The residence time under the heater is 2 seconds and the fabric, after leaving the heater zone, is continuously pressed against a shoe lining fabric comprising a loosely woven cotton muslin weighing about 90 to 200 g/m$^2$, e.g. 150 g/m$^2$, to form a firmly bonded laminate. The adhesive has an open time of 30 seconds, permitting any adjustments to be made if there is some relative movement between vinyl fabric and liner; "open time" is the time after activation or melting and discontinuing heating which it takes for a thin line of the adhesive to lose its tackiness and workability, i.e., for the adhesive to set.

It will be appreciated that the instant specification and examples are set forth by way of illustration and not limitation, and that various modifications and changes may be made without departing from the spirit and scope of the present invention.

What is claimed is:

1. In the adhesion of a first material coated with an activatable fusible adhesive to a second identical or different material to form a multiple-layer structure, the improvement which comprises using a fusible adhesive whose open time is about between 10 and 60 seconds, subjecting the adhesive-coated first material to pressure-free activation by infrared radiation at an activation time of about 0.5 to 10 seconds, then pressing the first and second materials together without additional heat input, and adjusting the relative positions of the first and second materials while the adhesive is still open.

2. Process according to claim 1, wherein the infrared radiation is aimed at the side of the first material coated with the fusible adhesive.

3. Process according to claim 1, wherein the fusible adhesive is applied to the first material in a cross-lattice pattern, the quantity amounting to about 30 to 120 g/m$^2$ and the open area amounting to about 50 to 70% of the total area.

4. Process according to claim 1, wherein the fusible adhesive comprises a copolyester or copolyester mixture composed of radicals of terephthalic acid, isophthalic acid or mixtures thereof, and radicals of a glycol or glycol mixtures, the copolyester being extended with about 0 to 75 wt % of a copolymer of ethylene and vinyl acetate.

5. Process according to claim 4, wherein the fusible adhesive has an open time of about 20 to 60 seconds and is applied to the first material to the extent of about 50 to 70 g/m$^2$ in a cross-lattice pattern to leave an open area of about 60 to 70%, the infrared radiation being aimed at the side of the first material coated with the adhesive, and the activation time ranging from about 1 to 5 seconds.

6. Process according to claim 5 wherein the first material is a shoe lining fabric and the second material is a shoe upper.

* * * * *